United States Patent
Serizawa et al.

(10) Patent No.: US 9,076,995 B2
(45) Date of Patent: Jul. 7, 2015

(54) SECONDARY BATTERY

(75) Inventors: Shin Serizawa, Minato-ku (JP); Hiroo Takahashi, Minato-ku (JP); Daisuke Kawasaki, Minato-ku (JP); Jiro Iriyama, Minato-ku (JP); Ryuichi Kasahara, Minato-ku (JP); Emiko Fujii, Minato-ku (JP); Tetsuya Kajita, Minato-ku (JP); Tatsuji Numata, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/426,020

(22) Filed: Mar. 21, 2012

(65) Prior Publication Data

US 2012/0244420 A1   Sep. 27, 2012

(30) Foreign Application Priority Data

Mar. 25, 2011   (JP) ................................. 2011-067916

(51) Int. Cl.
*H01M 2/12* (2006.01)
*H01M 2/02* (2006.01)

(52) U.S. Cl.
CPC ............ *H01M 2/02* (2013.01); *Y10T 29/49112* (2015.01); *H01M 2/1235* (2013.01); *H01M 2/1247* (2013.01); *H01M 2/1252* (2013.01); *H01M 2/12* (2013.01); *Y02E 60/122* (2013.01)

(58) Field of Classification Search
CPC ... H01M 2/12; H01M 2/1235; H01M 2/1247; H01M 2/1252
USPC ............ 429/57, 82, 131, 136, 162, 163, 180, 429/185
See application file for complete search history.

(56) References Cited

U.S. PATENT DOCUMENTS

| | | | | | |
|---|---|---|---|---|---|
| 3,853,629 | A | * | 12/1974 | Elliott | 429/86 |
| 3,870,556 | A | * | 3/1975 | Noll et al. | 442/106 |
| 3,870,566 | A | * | 3/1975 | Bergum et al. | 429/82 |
| 6,106,973 | A | * | 8/2000 | Sonozaki et al. | 429/162 |
| 8,415,050 | B2 | * | 4/2013 | Lee et al. | 429/162 |

(Continued)

FOREIGN PATENT DOCUMENTS

| | | |
|---|---|---|
| CN | 1510779 A | 7/2004 |
| JP | 10-055792 A | 2/1998 |

(Continued)

OTHER PUBLICATIONS

JP 2006004779 A English Machine Translation.*

(Continued)

*Primary Examiner* — Ula C Ruddock
*Assistant Examiner* — Scott J Chmielecki
(74) *Attorney, Agent, or Firm* — Sughrue Mion, PLLC

(57) ABSTRACT

A secondary battery according to the present exemplary embodiment is a secondary battery including a laminated electrode body provided with at least one pair of positive and negative electrodes and an outer enclosure that accommodates the laminated electrode body, wherein the outer enclosure includes one or more concave portions, inside a border corresponding to an outer edge of an electrode surface of an outermost layer of the laminated electrode body, on a surface facing the electrode surface, and wherein, when a band-shaped outer circumferential region having an area that is a half of an area inside the border is set inside the border, at least one of the concave portions is located inside the outer circumferential region.

20 Claims, 14 Drawing Sheets

(56) References Cited

U.S. PATENT DOCUMENTS

| | | | |
|---|---|---|---|
| 2005/0186472 A1* | 8/2005 | Kameyama et al. | 429/176 |
| 2007/0154803 A1* | 7/2007 | Kim et al. | 429/185 |
| 2008/0171259 A1* | 7/2008 | Kanai et al. | 429/53 |
| 2008/0187820 A1* | 8/2008 | Nakano et al. | 429/83 |
| 2010/0035140 A1* | 2/2010 | Miyahisa et al. | 429/129 |
| 2010/0035150 A1* | 2/2010 | Ando et al. | 429/209 |
| 2010/0047685 A1* | 2/2010 | Lee et al. | 429/176 |
| 2011/0014516 A1* | 1/2011 | Roh et al. | 429/185 |
| 2011/0059344 A1* | 3/2011 | Kawase et al. | 429/94 |
| 2011/0123844 A1* | 5/2011 | Bhardwaj et al. | 429/56 |
| 2011/0287308 A1* | 11/2011 | Kim et al. | 429/176 |

FOREIGN PATENT DOCUMENTS

| | | |
|---|---|---|
| JP | 2000-100399 A | 4/2000 |
| JP | 2002-056835 A | 2/2002 |
| JP | 2005-203262 A | 7/2005 |
| JP | 2005-251470 A | 9/2005 |
| JP | 2005-310671 A | 11/2005 |
| JP | 2006004779 A * | 1/2006 |
| JP | 2006004779 A * | 1/2006 |
| JP | 2006-185713 A | 7/2006 |
| JP | 2007-184242 A | 7/2007 |

OTHER PUBLICATIONS

Office Action dated Apr. 11, 2013 issued by the Korean Intellectual Property Office in counterpart Korean Patent Application No. 10-2012-0030107.

Communication dated Dec. 23, 2014, issued by the State Intellectual Property Office of the People's Republic of China in corresponding Chinese Application No. 201210082394.0.

* cited by examiner

SECONDARY BATTERY

This application is based upon and claims the benefit of priority from Japanese patent application No. 2011-67916, filed on Mar. 25, 2011, the disclosure of which is incorporated herein in its entirety by reference.

BACKGROUND OF THE INVENTION

1. Field of the Invention

The present invention relates to a secondary battery.

2. Description of the Related Art

Metallic cans have been mainly used for outer enclosures of secondary batteries. However, the number of applications of secondary batteries requiring a weight reduction such as cellular phones, notebook personal computers and automobiles is drastically growing in recent years. Therefore, so-called laminated batteries are starting to be used, using a laminated film which is relatively light-weighted and has a degree of freedom in molding for an outer enclosure to hermetically seal battery elements such as an electrode, electrode active material and electrolyte. Since the laminated film is flexible, a laminated battery is normally fixed to a case molded of resin, metal or the like and used as a battery module. Furthermore, when at least one of the laminated batteries is set up in one module, it is a general practice that the laminated batteries are tightly packed into the module so as to contact each other and improve an energy density per volume.

On the other hand, when the secondary battery in operation is overcharged or when an ambient temperature of the secondary battery becomes high for some reasons, a gas is generated due to decomposition of its electrolyte on the electrode. Since laminated batteries are generally tightly packed into the module as mentioned above, when a gas is generated and the secondary batteries swell, the case may be broken and the gas or electrolyte may leak out. Furthermore, when the gas generated accumulates around the electrode, this may prevent smooth exchange of lithium ions or the like and may thereby impair charge/discharge reaction.

In order to solve the problems caused by generation of a gas inside the battery, for example, JP2000-100399A discloses a laminated battery in which part of a heat-sealed portion of a laminated outer enclosure is heat-sealed at a lower temperature than the rest to create a portion with weak sealing strength and provides this portion with a function as a safety valve.

JP2002-56835A discloses a configuration in which part of an end of a heat-sealed portion of a laminated outer enclosure is removed from the outside. JP10-55792A discloses a configuration in which a triangular non-heat-sealed portion is provided inside part of the heat-sealed portion such that the width of the heat-sealed portion of the laminated outer enclosure that separates the interior of the battery from the outside of the battery becomes partially narrow. By providing a narrow heat-sealed portion in part of the heat-sealed portion of the laminated outer enclosure, these arts are intended to make the narrow heat-sealed portion function as a safety valve.

JP2005-203262A discloses a structure provided with a portion where peeling stress is concentrated because of swelling of an outer enclosure due to a pressure increase inside a secondary battery when a gas is generated so that this portion functions as a safety valve. JP2005-251470A discloses a structure provided with means for detecting a pressure inside a secondary battery and a heater, designed such that part of the outer enclosure sealed by heat-seal when the inner pressure increases is externally heated and melted by the heater. These arts are also intended to make the safety valve function taking advantage of an increase in the inner pressure of the secondary battery due to generation of a gas.

On the other hand, JP2005-310671A discloses a hermetically sealed battery in which a convex portion protruding toward the sealing side of an external terminal is formed on an outer enclosure. JP2006-185713A discloses a battery and a battery manufacturing apparatus capable of forming a creased portion in a fusing portion of a laminated film and thereby gradually releasing a high-pressure gas from the creased portion when the inner pressure in the battery case increases.

However, the battery disclosed in JP2000-100399A includes a safety valve structure in which the sealing strength of part of the heat-sealed portion is weakened, but stress is likely to be concentrated on the safety valve, resulting in a problem such as leakage of the electrolyte through degradation over time of the heat-sealed portion. Furthermore, it is difficult to adjust the sealing strength and not possible to accurately set an opening pressure of the safety valve.

According to the structures disclosed in JP2002-56835A and JP10-55792 of partially narrowing the width of the heat-sealed portion, the width of the heat-sealed portion of the part that functions as the safety valve needs to be set to a very narrow width, for example, on the order of 1 mm to realize a practical opening pressure. Therefore, the sealing reliability may deteriorate or an error in the width of the heat-sealed portion caused in the manufacturing process may considerably affect the opening pressure as the safety valve, and as a result, the opening pressure cannot accurately be set. One reason for such a very narrow width being required is that the thermally fusing strength (sealing strength) of the battery provided with the laminated outer enclosure is likely to be weakened at a leader part of the lead terminal for leading out the electrode, and to prevent the gas from releasing from the leader part of the lead terminal, it is necessary to open the safety valve at a lower pressure than the pressure at which the gas is released from the leader part of the lead terminal.

With the structure disclosed in JP2005-203262A using the portion where stress is concentrated due to an increase in the inner pressure as the safety valve, the sealing step becomes too complicated to manufacture a secondary battery with high reliability.

With the structure disclosed in JP2005-251470A provided with inner pressure detecting means and a heater, a mechanism for detecting the inner pressure is required, which complicates the battery circuit.

With the batteries disclosed in JP2000-100399A, JP2002-56835A, JP10-55792A, JP2005-203262A and JP2005-251470A, at least one of the single laminated batteries is tightly placed so as to contact each other, so that when the battery is prevented from swelling due to generation of a gas, the gas accumulates between the electrodes or in the vicinity of the heat-sealed portion of the laminate located apart from the safety valve, and the operation of the safety valve may be thereby retarded. Furthermore, the gas generated may accumulate in the vicinity of the electrode, which may hamper charge/discharge reaction.

With the structure disclosed in JP2005-310671A with a convex portion protruding on the sealing side of the external terminal formed on the outer enclosure, when a large volume of gas is generated due to an overvoltage or the like and an inner pressures increases, the vicinity of the terminal easily swells, the distance between the electrodes increases and it becomes difficult to exchange of lithium ions or the like which would originally take place smoothly. As a result, a phenomenon of producing a current flow locally concentrated in the laminated electrode body may occur and the battery may be further heated. Furthermore, when the gas is released outside, the electrolyte or the like may leak in the vicinity of the external terminal, triggering corrosion of surrounding wires or problems with the circuit.

With the structure disclosed in JP2006-185713A in which a crease is formed in the heat-sealed portion of the laminated film, distortion caused by contraction of thermoplastic resin is concentrated on the creased portion during heat-sealing and stress is thereby concentrated on the creased portion in an application of repeatedly receiving vibration of a cellular phone or the like and the adhesive property of the film may easily deteriorate. As a result, the electrolyte may leak out from the creased portion or outside air may enter the laminated film, and charge/discharge reaction may be affected with time.

An exemplary object of the invention is to provide a secondary battery capable of promoting charge/discharge reaction.

SUMMARY OF THE INVENTION

A secondary battery according to an exemplary aspect of the invention is a secondary battery including a laminated electrode body provided with at least one pair of positive and negative electrodes and an outer enclosure that accommodates the laminated electrode body, wherein the outer enclosure includes one or more concave portions, inside a border corresponding to an outer edge of an electrode surface of an outermost layer of the laminated electrode body, on a surface facing the electrode surface, and wherein, when a band-shaped outer circumferential region having an area that is a half of an area inside the border is set inside the border, at least one of the concave portions is located inside the outer circumferential region.

Furthermore, a method of manufacturing a secondary battery according to an exemplary aspect of the invention is a method of manufacturing a secondary battery including a laminated electrode body provided with at least one pair of positive and negative electrodes and an outer enclosure that accommodates the laminated electrode body, including, preparing an outer enclosure provided with one or more concave portions, inside a border corresponding to an outer edge of an electrode surface of an outermost layer of the laminated electrode body, on a surface facing the electrode surface; wherein, when a band-shaped outer circumferential region having an area that is a half of an area inside the border is set inside the border, at least one of the concave portions is located inside the outer circumferential region, and accommodating the laminated electrode body in the outer enclosure.

The present exemplary embodiment can provide a secondary battery capable of promoting charge/discharge reaction.

DETAILED DESCRIPTION OF THE PREFERRED EMBODIMENTS

[Secondary Battery]

Figure 1:
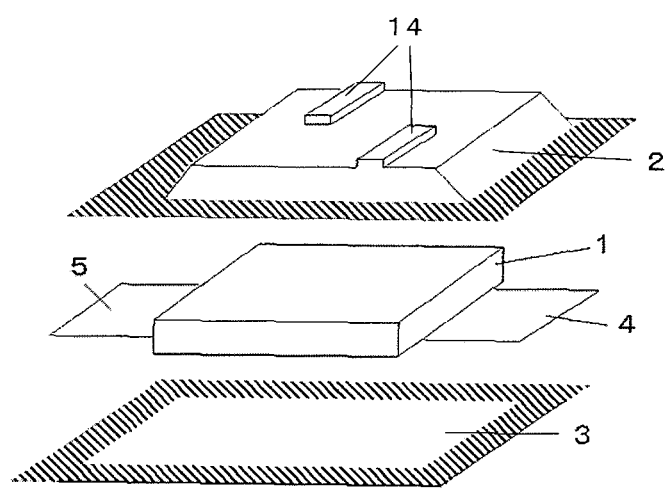
FIG. 1 is an exploded perspective view illustrating an example of a secondary battery according to the present exemplary embodiment.

A secondary battery according to the present exemplary embodiment includes a laminated electrode body provided with at least one pair of positive and negative electrodes and an outer enclosure that accommodates the laminated electrode body. FIG. 1 is an exploded perspective view illustrating a configuration of an example of the secondary battery according to the present exemplary embodiment. As shown in FIG. 1, rectangular parallelepiped laminated electrode body 1 is accommodated in laminated outer enclosure 2 provided with concave portions 14 and laminated outer enclosure 3. Parts of positive electrode lead terminal 4 and negative electrode lead terminal 5 connected to laminated electrode body 1 protrude outside of laminated outer enclosure 2 and laminated outer enclosure 3. Shaded areas of laminated outer enclosure 2 and laminated outer enclosure 3 in FIG. 1 illustrate an area where laminated outer enclosure 2 and laminated outer enclosure 3 adhere to each other through heat sealing. Furthermore, laminated electrode body 1 contains an electrolyte (not shown).

(Outer Enclosure)

The outer enclosure according to the present exemplary embodiment includes one or more concave portions, inside a border corresponding to an outer edge of an electrode surface of an outermost layer of the laminated electrode body, on a surface facing the electrode surface, and when a band-shaped outer circumferential region having an area that is a half of an area inside the border is set inside the border, at least one of the concave portions is located inside the outer circumferential region.

In the present exemplary embodiment, concave portions are provided on the surface of the outer enclosure facing the electrode surface and the concave portions are located at the outer edge of the surface of the outer enclosure. This allows a gas generated from the electrode of the outermost layer of the laminated electrode body to efficiently flow from the central part to the outer edge via the concave portions and eventually allows the gas to escape to the vicinity of the bonded part of the outer enclosure. Therefore, it is possible to smoothly exchange lithium ions or the like, promote charging/discharging reaction and improve a capacity retention ratio in cycles.

Furthermore, the concave portions also function as a collector for the gas generated and can promote charging/discharging reaction. In addition to the concave portions, there can also be a gas collecting section that allows the gas flown via the concave portions to accumulate in the vicinity of the bonded portion of the outer enclosure.

Figure 3:
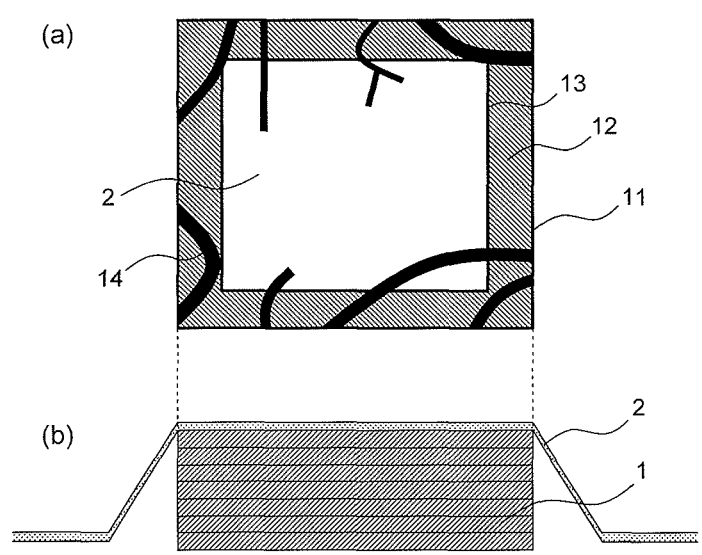
FIG. 3 is a cross-sectional view and a plan view illustrating an example of the secondary battery according to the present exemplary embodiment.

FIG. 3 shows a schematic cross-sectional view (FIG. 3(b)) and a plan view (FIG. 3(a)) of an example of the secondary battery according to the present exemplary embodiment. The plan view in FIG. 3(a) shows a surface inside laminated outer enclosure 2 (hereinafter referred to as "inside surface of laminated outer enclosure 2") facing the electrode surface of the outermost layer of laminated electrode body 1. The electrode surface of the outermost layer of laminated electrode body 1 refers to the surface of the positive electrode or negative electrode arranged in the outermost layer of laminated electrode body 1.

As shown in FIG. 3(a), in the present exemplary embodiment, one or more concave portions 14 are provided on the inside surface of laminated outer enclosure 2. In FIG. 3(a), band-shaped outer circumferential region 12 (shaded area) having an area that is a half of an area inside border 11 corresponding to the outer edge of the electrode surface is set inside border 11, on the inside surface of laminated outer enclosure 2. In this case, at least one of concave portions 14 is located inside outer circumferential region 12 in the present exemplary embodiment. Suppose the area in the present exemplary embodiment is an area of an image projected onto the planar surface facing the electrode surface.

Thus, at least one of concave portions 14 is located inside outer circumferential region 12 of the inside surface of laminated outer enclosure 2, and it is thereby possible to allow a gas generated from the electrode of the outermost layer of laminated electrode body 1 to escape from the central part to the outer edge through concave portions 14. The gas is assumed to flow into the outer edge via concave portions 14 or jumping over at least one of concave portions 14. This makes it possible to allow the gas generated from the electrode of the outermost layer of laminated electrode body 1 to efficiently escape to the vicinity of the bonded portion of the outer enclosure and promote charging/discharging reaction. In the secondary battery, a gas is normally generated due to decomposition of the electrolyte during charge/discharge. The amount of gas generated may vary depending on the type of the electrolyte, the condition of initial charge/discharge and the degree of overdischarge.

The shape of border 11 is rectangular in FIG. 3(a), but is not particularly limited thereto. Even in cases where the shape of border 11 is other than rectangular, it is possible to set band-shaped outer circumferential region 12 (shaded area) having an area that is a half of an area inside border 11, inside border 11. In this case, outer circumferential region 12 can keep an evenly spaced width in the inward direction of border 11. Regarding the method of setting outer circumferential region 12, outer circumferential region 12 can be set by calculating the area of border 11, for example, through image processing using an optical microscope or using a publicly known measuring instrument such as a vernier caliper or surface coarseness measuring instrument, then determining such a width of outer circumferential region 12 that the area of outer circumferential region 12 becomes half the area of border 11.

From the standpoint of allowing the gas generated to more efficiently escape to the outer edge, the ratio of the area occupied by concave portion 14 inside outer circumferential region 12 to the area occupied by concave portion 14 inside border 11 is preferably 1% or more, more preferably 30% or more and further preferably 50% or more and particularly preferably 60% or more. On the other hand, the ratio is preferably 95% or less. Especially when the ratio of concave portion 14 located in the central part of the inside surface of laminated outer enclosure 2 is small, when a gas is generated, laminated electrode body 1 is sufficiently held by laminated outer enclosure 2 in the central part of the inside surface of laminated outer enclosure 2 and it is possible to prevent the distance between the electrodes of laminated electrode body 1 from increasing due to generation of a gas. Furthermore, the area ratio can be measured through image processing using an optical microscope or using a publicly known measuring instrument such as a vernier caliper, surface coarseness measuring instrument.

Concave portion 14 in the present exemplary embodiment refers to a crease-like dented portion. That is, concave portion 14 refers to a portion dented like a crease with respect to the surface of the outer enclosure facing the electrode surface of the outermost layer of laminated electrode body 1.

Of concave portion 14, it is preferable that the ratio of concave portion 14 contacting border 11 is 1% or more from the standpoint of being able to more efficiently pass the gas generated to the outer edge and eventually allow the gas to escape to the vicinity of the bonded portion of the outer enclosure. The ratio is more preferably 30% or more, further preferably 50% or more and particularly preferably 65% or more. The ratio may also be 100%. Here, contacting border 11 requires that concave portion 14 touch border 11, and concave portion 14 may pass over border 11. When concave portion 14 included in outer circumferential region 12 contacts border 11, concave portion 14 is preferably further formed from border 11 to the bonded portion of the outer enclosure from the standpoint of gas releasing efficiency.

Furthermore, of concave portion 14, the ratio of concave portion 14 contacting border 11 and inner edge 13 of outer circumferential region 12 is preferably 30% or more because the gas generated in the central part of the electrode surface is thereby allowed to escape to the outer edge more efficiently. The ratio is more preferably 50% or more, further preferably 60% or more and particularly preferably 80% or more. The ratio may also be 100%. Here, contacting border 11 and inner edge 13 of outer circumferential region 12 requires that one concave portion 14 touch both border 11 and inner edge 13 of outer circumferential region 12. For example, it is possible to adopt a mode in which concave portion 14 extends from border 11 and passes over inner edge 13 of outer circumferential region 12 or a mode in which concave portion 14 extends from border 11, contacts inner edge 13 of outer circumferential region 12 and returns to border 11 again.

The ratio of the area occupied by concave portion 14 in outer circumferential region 12 to the area of outer circumferential region 12 is preferably 1 to 80%. Setting the ratio to 1% or more allows the gas to be released to outside sufficiently and allows charging/discharging reaction to improve. Furthermore, setting the ratio to 80% or less makes it possible to prevent the distance between the electrodes from increasing due to swelling of the electrode when lithium ions are exchanged, exchange lithium ions or the like smoothly and allow charging/discharging reaction to take place efficiently. The ratio is more preferably 1 to 50% from the standpoint of cycle characteristics, further preferably 1 to 30% and particularly preferably 1 to 10%.

Figure 4:
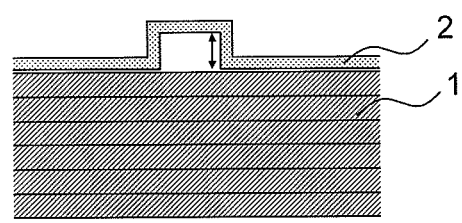
FIG. 4 is a cross-sectional view illustrating an example of a concave portion according to the present exemplary embodiment.

The ratio of the height of concave portion 14 to the thickness of laminated electrode body 1 is preferably 1 to 500%. Setting the ratio to 1% or more makes it possible to sufficiently discharge the gas to the outer edge and promote charging/discharging reaction. Furthermore, setting the ratio to 500% or less improves an energy density per capacity. From the standpoint of cycle characteristics, the ratio is more preferably 2 to 400%, further preferably 3 to 200% and particularly preferably 5 to 50%. The height of concave portion 14 is a height (depth) relative to the surface of the outer enclosure facing the electrode surface of the outermost layer of laminated electrode body 1. To be more specific, the height of concave portion 14 corresponds to the length of a portion indicated by a bidirectional arrow in FIG. 4. The height of concave portion 14 can be measured using a publicly known measuring instrument such as a vernier caliper, surface coarseness measuring instrument. The thickness of laminated electrode body 1 can be, for example, 0.05 to 10 mm. Furthermore, the height of concave portion 14 can be, for example, 0.05 to 5 mm.

The shape of concave portion 14 is not particularly limited, and may be, for example, rectangular parallelepiped, trapezoidal, columnar, triangular prism shaped, spherical or curved or branched at some midpoint. Furthermore, at least one of concave portions 14 may intersect each other. The height and width of concave portion 14 may change at some midpoint. The number of concave portions 14 is not particularly limited as long as it satisfies the specification of the distribution of concave portions 14 according to the present exemplary embodiment and allows the gas generated to escape to the outer edge sufficiently.

Concave portions 14 according to the present exemplary embodiment are formed in laminated outer enclosure 2 in FIG. 1, but may also be formed on any one of two outer enclosures or both of them. Concave portions 14 are preferably formed on both of the two outer enclosures from the standpoint of gas releasing efficiency.

The measuring timing of concave portion 14 is not particularly limited, but measurement is preferably performed after aging or after 10 cycles from the standpoint of a cycle life. The aging condition is not particularly limited and aging may be performed under a condition publicly known to those skilled in the art and, for example, aging is completed by leaving the secondary battery for a predetermined period within a temperature range from the room temperature to 60° C. after initial charging and then discharging the secondary battery. Furthermore, gas draining may be performed after aging or during a cycle.

The method of forming concave portion 14 on the outer enclosure surface facing the electrode surface of the outermost layer of laminated electrode body 1 is not particularly limited. When the outer enclosure is a laminated outer enclosure, concave portion 14 is preferably formed using squeezing (deep squeezing) whereby the laminated outer enclosure is pressed in and molded using a punch and die while slidably holding the laminated outer enclosure around a portion to be molded. Concave portion 14 may also be formed using stretch forming by fixing the laminated outer enclosure around the portion to be molded without allowing the laminated outer enclosure to slide and pulling and stretching the laminated outer enclosure using a die. Furthermore, concave portion 14 may also be formed using compression molding or a roller having a convex portion. When the outer enclosure is a flexible laminated outer enclosure, there may be cases where the electrode swells or contracts with an increased number of cycles, concave portions are generated and formed concave portions 14 are deformed. However, according to the present exemplary embodiment, concave portions 14 according to the present exemplary embodiment need to be formed when the secondary battery is manufactured and the effect of promoting charging/discharging reaction is obtained even with an increased number of cycles if the number of cycles falls within the range of the present exemplary embodiment.

The material of the outer enclosure according to the present exemplary embodiment is not particularly limited and, for example, a laminated outer enclosure such as a laminated film and a metallic can may be used. Among them, a laminated outer enclosure is preferably used as the outer enclosure.

The laminated outer enclosure used for the present exemplary embodiment is not particularly limited as long as it has flexibility and can seal laminated electrode body 1 without leaking the electrolyte. Examples of the laminated outer enclosure configuration include a configuration in which a metal thin-film layer and a thermally fusible resin layer are laminated together, a configuration in which a protective layer made of polyester such as polyethylene terephthalate or nylon is further laminated on a surface opposite to the surface on which the thermally fusible resin layer on the metal thin-film layer is laminated.

As the metal thin-film layer, for example, a foil of Al, Ti, Ti alloy, Fe, stainless steel, Mg alloy or the like may be used. One kind of these materials may be used or two or more kinds may be combined or an alloy of such materials may be used. The thickness of the metal thin-film layer may be 10 to 100 μm, for example.

Resin used for the thermally fusible resin layer is not particularly limited as long as it is thermally fusible resin. As the resin, for example, polypropylene, polyethylene, or acid-transformation product of these, polyester such as polyphenylene sulfide, polyethylene terephthalate, polyamide, ethylene-vinyl acetate copolymer or the like may be used. One kind of these materials may be used or two or more kinds may also be used in combination. The thickness of the thermally fusible resin layer is preferably 10 to 200 μm and more preferably 30 to 100 μm. When the thickness of the thermoplastic resin layer is 10 μm or more, the dynamic strength of the outer enclosure is sufficient, reducing the likelihood of inconvenience of rupture easily taking place in the thermoplastic resin layer. Furthermore, since the thickness of the thermoplastic resin layer is 200 μm or less, flexibility improves and workability in molding improves. The thickness of the entire outer enclosure is preferably 20 to 500 μm.

As in the case of laminated outer enclosure 2 in FIG. 1, the outer enclosure preferably has a rectangular portion having a depth that allows laminated electrode body 1 to be accommodated. The rectangular portion may be formed on one of the two outer enclosures to be bonded or may be formed on both outer enclosures. When the rectangular portion is formed on one outer enclosure, the depth of the rectangular portion is preferably a depth equal to or greater than the thickness of laminated electrode body 1, whereas when the rectangular portion is formed on both outer enclosures, the depth thereof is preferably a depth half or more of the thickness of laminated electrode body 1. Since the rectangular portion is normally formed according to the shape of laminated electrode body 1, the outer edge of the rectangular portion as shown in FIG. 3 corresponds to the outer edge of the electrode surface of laminated electrode body 1 and becomes border 11.

An area enough to store a gas generated may be provided beforehand in the vicinity of the bonded portion of the outer enclosure. For example, an area in which the outer enclosures are placed in close contact with each other adjacent to the bonded portion, and in which the outer enclosures are not bonded each other, may also be provided beforehand. Furthermore, the outer enclosure need not be provided with a safety valve in the present exemplary embodiment, which is advantageous compared to a secondary battery for which the safety valve is an indispensable component.

(Laminated Electrode Body)

Figure 2:
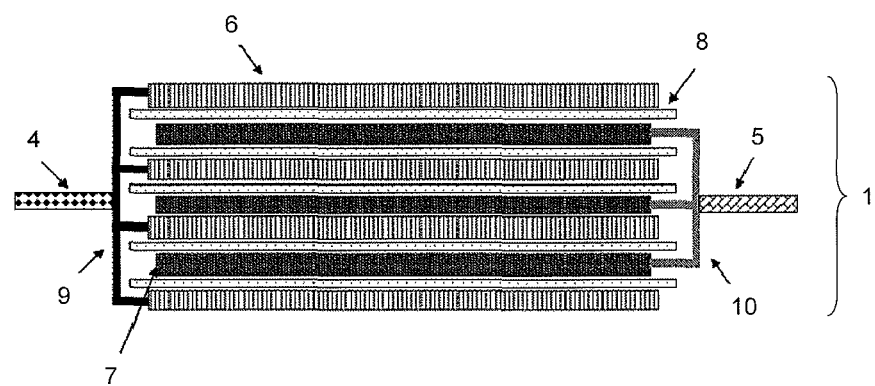
FIG. 2 is a cross-sectional view illustrating an example of a laminated electrode body and a lead terminal of the secondary battery according to the present exemplary embodiment.

FIG. 2 shows an example of the laminated electrode body and the lead terminals of the secondary battery according to the present exemplary embodiment. Laminated electrode body 1 shown in FIG. 2 has a laminated structure made up of at least one of rectangular strip-shaped positive electrodes 6 and rectangular strip-shaped negative electrodes 7 laminated one on another. To be more specific, at least one of positive electrodes 6 and at least one of negative electrodes 7 are alternately stacked one on another with separator 8 interposed therebetween. An active material uncoated portion where no active material is coated is provided at one end of each positive electrode 6 and each negative electrode 7. Positive electrodes 6 and negative electrodes 7 are stacked one on another with their active material uncoated portions placed in directions opposite to each other. Positive electrode lead terminal 4 and negative electrode lead terminal 5 are connected to the active material uncoated portion of positive electrode 6 and the active material uncoated portion of negative electrode 7 via positive electrode collector 9 and negative electrode collector 10 respectively.

Laminated electrode body 1 is preferably provided with convex portions on the electrode surface of the outermost layer and concave portions 14 of the outer enclosure surface are preferably formed in correspondence with the convex portions. Here, that concave portions 14 is formed in correspondence with the convex portions of the electrode surface means that the outer enclosure surface comes into contact with the convex portions of the electrode surface, the shape of the convex portions of the electrode surface is partially transferred to the outer enclosure surface and concave portions 14 having the same shape as the convex portions on the electrode surface are thereby formed. Therefore, the convex portions of the electrode surface preferably have a similar distribution as that of concave portions 14 of the outer enclosure surface. Providing convex portions on the electrode surface makes it possible to efficiently release a gas generated through the convex portions of the electrode surface, and thereby obtain a greater effect of promoting charging/discharging reaction. Furthermore, forming concave portions 14 of the outer enclosure surface in correspondence with the convex portions of the electrode surface makes it possible to improve the accuracy of the distribution and position of concave portions 14. 0.1% or more of concave portion 14 of the outer enclosure surface is preferably formed in correspondence with the convex portions of the electrode surface and 1% or more is more preferably formed in correspondence with the convex portions of the electrode surface and 10% or more is further preferably formed in correspondence with the convex portions of the electrode surface.

The method of forming convex portions on the electrode surface of the outermost layer of laminated electrode body 1 is not particularly limited. For example, convex portions may be formed when the electrode is manufactured or convex portions may be formed through nonuniform swelling or contraction of the electrode during charge/discharge. Examples of the method of forming convex portions when the electrode is manufactured include a method of pressing the portion to be coated with the active material on the electrode surface using a roller or metal die having concave portions and a method of partially changing the thickness of the collector or portion to be coated with the active material. Furthermore, examples of the method of forming convex portions during charge/discharge include a method of performing charge/discharge using an electrode containing an active material (compound containing tin and silicon or the like) having a high volume expansion coefficient during charge/discharge in portions where the convex portions are formed and a method of performing charge/discharge using an electrode with increased concentration of an active material having a high volume expansion coefficient during charge/discharge in portions where the convex portions are formed.

The outer enclosure surface on which concave portions 14 are formed is preferably made to have close contact with the electrode surface of the outermost layer of laminated electrode body 1, but when the electrode surface of the outermost layer of laminated electrode body 1 is provided with convex portions, there may be a clearance of 0.01 to 0.1 mm between the outer enclosure surface and the electrode surface. The clearance is preferably filled with an electrolyte for stable exchange of lithium ions.

A mode may also be adopted for laminated electrode body 1 in which a gas generated can pass through each layer of the electrode and separator. In this case, the gas generated in laminated electrode body 1 can also be released to the outer edge through concave portions 14 to promote charging/discharging reaction. For example, positive electrode 6, negative electrode 7 and separator 8 may be a porous material or mesh-like material. In the present exemplary embodiment, when positive electrode 6, negative electrode 7 and separator 8 are tabular materials that do not allow the gas to pass, the gas generated in laminated electrode body 1 is released from ends of positive electrode 6, negative electrode 7 and separator 8, but the gas generated from the electrode of the outermost layer of laminated electrode body 1 is released to the outer edge through concave portions 14 as described above, and therefore charging/discharging reaction is promoted. Furthermore, when the outermost layer of laminated electrode body 1 has no layer containing the electrode active material in the present exemplary embodiment, when, for example, the outermost layer is an electrode collector, concave portions 14 function as a gas collector for the gas released from the ends of positive electrode 6, negative electrode 7 and separator 8 and charging/discharging reaction is thereby promoted.

Furthermore, laminated electrode body 1 may have a winding structure. When laminated electrode body 1 has a winding structure, similar effects can be obtained by forming concave portions 14 using a portion corresponding to a maximum curvature as the outer edge of the electrode surface of laminated electrode body 1.

(Positive Electrode)

Positive electrode 6 provided for laminated electrode body 1 according to the present exemplary embodiment is not particularly limited and a normal positive electrode for a secondary battery may be used. Examples of the active material for the positive electrode contained in positive electrode 6 include lithium containing composite oxide such as $LiCoO_2$, $LiNiO_2$, $LiNi_{0.80}Co_{0.15}Al_{0.15}O_2$, $LiMn_2O_4$, $LiNi_{1/3}Co_{1/3}Mn_{1/3}O_2$, $LiNi_{0.5}Mn_{1.5}O_4$ and $LiFePO_4$. As the active material for the positive electrode contained in positive electrode 6, a transition metal portion of these lithium containing composite oxides may be substituted by other elements or may be a mixture of these lithium containing composite oxides.

As the method of manufacturing positive electrode 6, for example, a positive electrode active material, an electrical conductivity imparting agent such as carbon black and a binder such as polyvinylidene fluoride (PVdF) are scattered and kneaded in a solvent that can dissolve the binder such as N-methyl-2-pyrrolidone (NMP) to prepare a positive electrode slurry. The positive electrode slurry is applied to a positive electrode collector such as an aluminum foil and the solvent is dried, and positive electrode 6 can be thereby manufactured. Furthermore, positive electrode 6 may also be manufactured by forming a film of a positive electrode active material or the like on the positive electrode collector using a vapor deposition method such as vapor deposition and sputtering.

(Negative Electrode)

Negative electrode 7 provided for laminated electrode body 1 according to the present exemplary embodiment is not particularly limited and a normal negative electrode for a secondary battery may be used. Examples of the negative electrode active material contained in negative electrode 7 include materials that can store or release lithium such as lithium metal or graphite material, amorphous carbon material, titanium compound material, tin material, tin compound material, silicon material such as silicon, silicon compound material such as silicon oxide. One kind of these materials may be used or two or more kinds may be mixed for use. The present exemplary embodiment provides concave portions 14 on the outer enclosure surface facing the electrode surface of the outermost layer of laminated electrode body 1 and can thereby accommodate part of the electrode whose volume changes in concave portions 14 while preventing increases in the distance between the electrodes. Thus, the present exemplary embodiment can also preferably use a negative electrode active material containing elements such as tin and silicon having a high expansion coefficient when Li is stored.

As the method of manufacturing negative electrode 7, for example, negative electrode active material, electrical conductivity imparting agent such as carbon black and a binder such as PVdF, a polymer having amide bond or imide bond are scattered and kneaded in a solvent such as NMP that can dissolve the binder and a negative electrode slurry is prepared. Negative electrode 7 can be manufactured by applying the negative electrode slurry onto a negative electrode collector such as a copper foil and drying the solvent. Negative electrode 7 may also be manufactured by forming a film of a negative electrode active material on the negative electrode collector using a vapor deposition method such as vapor deposition and sputtering. The negative electrode active material layer may be formed on the entire surface onto which the negative electrode slurry is coated using the above-described coating method or the negative electrode slurry may be interspersed on part of the surface to be coated.

(Lead Terminal)

As the material of positive electrode lead terminal 4 and negative electrode lead terminal 5 according to the present exemplary embodiment, Al, Cu, phosphor bronze, Ni, Ti, Fe, brass, stainless steel or the like can be used. One kind of these materials may be used or two or more kinds of these materials may be combined or an alloy of such materials may be used. Annealing processing may be applied to positive electrode lead terminal 4 and negative electrode lead terminal 5 if necessary. Positive electrode lead terminal 4 and negative electrode lead terminal 5 preferably have a planar shape. The thickness of positive electrode lead terminal 4 and negative electrode lead terminal 5 preferably ranges from 20 μm to 2 mm. Positive electrode lead terminal 4 and negative electrode lead terminal 5 may be bent into a crank shape.

(Separator)

Separator 8 provided for laminated electrode body 1 according to the present exemplary embodiment is not particularly limited and a normal separator for a secondary battery can be used. As separator 8, for example, woven textile, non-woven fabric cloth, porous membrane or the like can be used. A polypropylene or polyethylene-based porous membrane is particularly preferable as separator 8 because such a membrane can be easily thinned or made to have a large area or also from the standpoint of membrane strength or membrane resistance. The surface of separator 8 may be coated with an oxide such as aluminum oxide.

(Electrolyte)

The electrolyte used in the present exemplary embodiment is not particularly limited and a normal electrolyte for a secondary battery can be used. As the electrolyte, for example, a non-aqueous electrolyte which is lithium salt as an electrolyte dissolved in a non-aqueous solvent can be used.

Examples of lithium salt include lithium imide salt, $LiPF_6$, $LiAsF_6$, $LiAlCl_4$, $LiClO_4$, $LiBF_4$, $LiSbF_6$. Examples of lithium imide salt include LiN $(C_kF_{2k+1}SO_2)(C_mF_{2m+1}SO_2)$ (k and m are 1 or 2 independently). Among these examples of lithium salt, $LiPF_6$ and $LiBF_4$ are preferable. One kind of such lithium salt may be used or two or more kinds thereof may be used in combination.

As the non-aqueous solvent, for example, at least one or more kinds of organic solvents selected from the group of cyclic carbonate, chain carbonate, aliphatic carboxylic acid ester, γ-lactone, cyclic ether, chain ether and their derivatives can be used. Examples of cyclic carbonate include propylene carbonate (PC), ethylene carbonate (EC), butylene carbonate (BC) and derivative thereof. Examples of chain carbonate include dimethyl carbonate (DMC), diethyl carbonate (DEC), ethylmethyl carbonate (EMC), dipropyl carbonate (DPC) and derivative thereof. Examples of aliphatic carboxylic acid ester include methyl formate, methyl acetate, ethyl propionate and derivative thereof. Examples of γ-lactone include γ-butyrolactone and derivative thereof. Examples of cyclic ether include tetrahydrofuran and 2-methyltetrahydrofuran. Examples of chain ether include 1,2-diethoxyethane (DEE), ethoxy-methoxy ethane (EME), diethyl ether and derivative thereof. Furthermore, as the non-aqueous solvent, in addition to these materials, dimethyl sulfoxide, formamide, acetoamide, dimethylformamide, dioxolane such as 1,3-dioxolane, acetonitrile, propylnitrile, nitromethane, ethylmonoglyme, phosphate triester, trimethoxymethane, dioxolane derivative, sulfolane, methylsulfolane, 1,3-dimethyl-2-imidazolidinone, 3-methyl-2-oxazolidinone, propylene carbonate derivative, tetrahydrofuran derivative, ethylether, 1,3-propanesultone, anisole, N-methylpyrrolidone, fluorinated carboxylic acid ester or the like can be used. One kind of these non-aqueous solvents may be used or two or more kinds thereof may be used in combination.

Furthermore, as an additive of the electrolyte, for example, vinylene carbonate (VC) can also be used. Furthermore, a gel electrolyte can also be used in the present exemplary embodiment.

[Method of Manufacturing Secondary Battery]

The method of manufacturing a secondary battery according to the present exemplary embodiment is a method of manufacturing a secondary battery including laminated electrode body 1 provided with at least one pair of positive electrode 6 and negative electrode 7 and an outer enclosure that accommodates laminated electrode body 1, including: preparing an outer enclosure provided with one or more concave portions 14, inside border 11 corresponding to an outer edge of an electrode surface of an outermost layer of laminated electrode body 1, on a surface facing the electrode surface; wherein when band-shaped outer circumferential region 12 having an area that is a half of an area inside border 11 is set inside border 11, at least one of concave portions 14 is located inside outer circumferential region 12; and accommodating laminated electrode body 1 in the outer enclosure.

When the outer enclosure is a laminated outer enclosure, preparing the outer enclosure preferably includes forming concave portion 14 in outer circumferential region 12 of the laminated outer enclosure using squeezing from the standpoint that concave portion 14 can be formed more accurately. Furthermore, when laminated electrode body 1 is provided with convex portions on the electrode surface of the outermost layer, preparing the outer enclosure preferably includes forming concave portion 14 in correspondence with the convex portion. The convex portion of the electrode surface is preferably formed by pressing the electrode surface of the outermost layer of laminated electrode body 1 using a roller or metal die from the standpoint that the convex portion can be formed more accurately. The roller or metal die may be a roller or metal die having a concave portion.

The secondary battery according to the present exemplary embodiment can be manufactured using the following methods, for example. Positive electrode 6 and negative electrode 7 are arranged so as to face each other across separator 8 and laminated one on another to manufacture laminated electrode body 1. Positive electrode lead terminal 4 and negative electrode lead terminal 5 are connected to each positive electrode 6 and each negative electrode 7 via positive electrode collector 9 and negative electrode collector 10 respectively. Laminated electrode body 1 is accommodated in the outer enclosure in which concave portions 14 according to the present exemplary embodiment are formed and immersed in an electrolyte. The outer enclosure is sealed such that parts of positive electrode lead terminal 4 and negative electrode lead terminal 5 protrude outside. The secondary battery can be manufactured in this way.

During the sealing operation, sealing is preferably performed with the pressure inside the secondary battery reduced to minimize the size of the secondary battery. Furthermore, the lead terminal is preferably heat-sealed with a coating material made of thermoplastic resin in the portion contacting the outer enclosure before sealing.

Although the present exemplary embodiment has been described using typical examples, the present exemplary embodiment is not limited to those examples but can be changed as appropriate without departing from the scope of the technical thought of the present exemplary embodiment. For example, good characteristics as the secondary battery can be obtained even when a publicly known gas collection technique or a publicly known safety valve introducing technique is used for the secondary battery according to the present exemplary embodiment.

Furthermore, the present exemplary embodiment is also applicable to an electric device configured by sealing, with an outer enclosure, electric device elements such as a capacitor like electric double layer capacitor, capacitor element such as electrolytic capacitor capable of accumulating electric energy inside and generating a gas accompanied by heat generation through chemical reaction and physical reaction.

EXAMPLES

Hereinafter, the present exemplary embodiment will be described using specific examples, but the present exemplary embodiment is not limited to these examples.

Example 1

Configuration of Secondary Battery

FIG. 1 shows an exploded perspective view illustrating an inner structure of a secondary battery according to the present example. Laminated electrode body 1 to which positive electrode lead terminal 4 and negative electrode lead terminal 5 are connected as external terminals contains an electrolyte (not shown) and is accommodated in laminated outer enclosure 2 and laminated outer enclosure 3. Concave portions 14, which will be described later, are formed in laminated outer enclosure 2.

(Manufacture of Laminated Electrode Body 1)

Silicon, amorphous silicon oxide ($SiO_x$, $0<x\leq2$) and graphite were measured at a mass ratio of 29:61:10. These materials were mixed for 24 hours through so-called mechanical milling and a negative electrode active material was obtained. The negative electrode active material and polyimide (product name: U-Varnish A, manufactured by Ube Industries, Ltd.) as a binder were measured at a mass ratio of 80:20, these two were mixed with n-methylpyrrolidone and a negative electrode slurry was prepared. The negative electrode slurry was applied to a copper foil having a thickness of 10 μm and was then dried. This was further heat-treated in a nitrogen atmosphere of 300° C. and a negative electrode was thereby manufactured.

Lithium containing composite oxide ($LiNi_{0.80}Co_{0.15}Al_{0.15}O_2$) as a positive electrode active material, carbon black as an electrical conductivity imparting agent and polyvinylidene fluoride as a binder were measured at a mass ratio of 90:5:5. These materials were mixed with n-methylpyrrolidone and a positive electrode slurry was prepared. The positive electrode slurry was applied to an aluminum foil having a thickness of 20 μm, dried, pressed, and a positive electrode was thereby manufactured.

The three positive electrodes and four negative electrodes obtained were stacked alternately one on another with a polypropylene porous film interposed therebetween as a separator. Ends of the positive electrode collectors not covered with the positive electrode active material and ends of the negative electrode collectors not covered with the negative electrode active material were welded respectively. An aluminum positive electrode lead terminal and a nickel negative electrode lead terminal were welded to the respective welded portions through ultrasound welding. The welded portion was further heat-sealed with a coating material made of thermoplastic resin. Thus, laminated electrode body 1 shown in FIG. 2 having a planar shape and a laminated structure including at least one of the laminated electrodes was obtained. The length of laminated electrode body 1 in a direction parallel to the protruding direction of the lead terminal was 28 mm, the length in a direction perpendicular to that direction was 26 mm and the thickness was 6 mm.

(Manufacture of Laminated Outer Enclosure 2)

Aluminum laminated films made up of three layers; a nylon layer having a thickness of 25 μm, a soft aluminum layer having a thickness of 40 μm and a polypropylene layer having a thickness of 30 μm were prepared as laminated outer enclosure 2 and laminated outer enclosure 3. Next, this aluminum laminated film was placed with the nylon layer facing outward, subjected to squeezing using a squeezing machine made up of a punch and die and laminated outer enclosure 2 shown in FIG. 1 was manufactured.

The squeezing-molded part of laminated outer enclosure 2 is made up of a rectangular portion in which laminated electrode body 1 is accommodated and two rectangular parallelepiped concave portions inside the rectangular portion. Regarding the size of the rectangular portion, the length in a direction parallel to the protruding direction of the lead terminal on the surface bonded to laminated outer enclosure 3 was 29 mm and the length in a direction perpendicular to that direction was 27 mm. Furthermore, regarding the surface on which the two concave portions were formed, the length in a direction parallel to the protruding direction of the lead terminal was 28 mm, and the length in a direction perpendicular to that direction was 26 mm. The depth of the rectangular portion except the two concave portions was 6 mm. The two concave portions had contact with the sides of the surface on which the concave portions of the rectangular portion are formed as shown in FIG. 1 from which positive electrode lead terminal 4 or negative electrode lead terminal 5 did not protrude and were arranged at positions at a distance of 9 mm from the other side respectively. Regarding the size of the two concave portions, the height was 0.3 mm, the width was 1 mm and the length from the end was 12 mm.

The area occupied by the two concave portions in outer circumferential region 12 was calculated through image processing using a digital microscope (product name: VHX-500, manufactured by KEYENCE CORPORATION) and the calculated area was 33% of the area occupied by the two concave portions in border 11. In the ratio calculations, outer circumferential region 12 was set so as to keep an evenly spaced width in the inward direction of border 11 and the evenly spaced width was 3.95 mm. In this case, since the area occupied by the two concave portions in outer circumferential region 12 was 7.9 mm$^2$ and the area occupied by the two concave portions in border 11 was 24 mm$^2$, the ratio was calculated to be 33%. Furthermore, both concave portions contacted border 11 and inner edge 13 of outer circumferential region 12. Furthermore, the ratio of the height of the concave portion to the thickness of laminated electrode body 1 was 5%.

(Manufacture of Secondary Battery)

Figure 5:
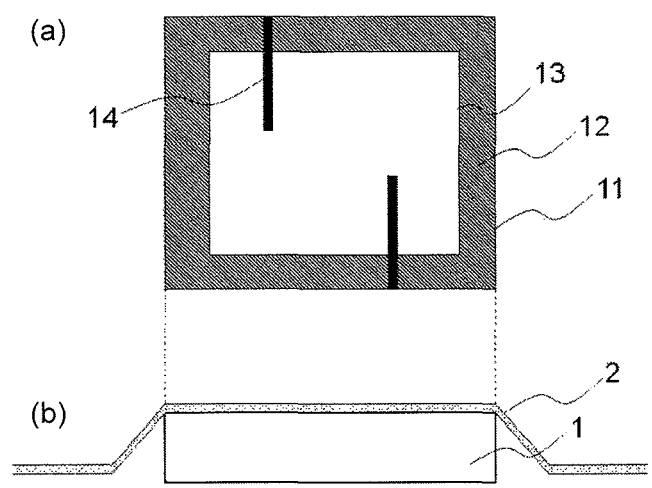
FIG. 5 is a cross-sectional view and a plan view illustrating an example of a secondary battery according to Examples 1 to 3.

Laminated electrode body 1 was accommodated inside laminated outer enclosure 2 and laminated outer enclosure 3 and a sealing operation was performed thereon. In the sealing operation, the sides (top sealing portion) from which positive electrode lead terminal 4 and negative electrode lead terminal 5 are drawn were heat-sealed, and one of two sides (side sealing portions) parallel to the protruding direction of positive electrode lead terminal 4 or negative electrode lead terminal 5 was heat-sealed. An electrolyte was injected from the remaining one side (side sealing portion) which was not heat-sealed, the interior thereof was set in a pressure reduced condition and the remaining one side (side sealing portion) was heat-sealed. Heat sealing was performed by sandwiching the shaded area in FIG. 1 by heaters or metal plates with a built-in heater. The width of the heat-sealed portion was 3 mm. As the electrolyte, a carbonate-based non-aqueous electrolyte was used in which LiPF$_6$ as support salt was dissolved to a concentration of 1 mol/L in a mixed solvent of EC/PC/DMC/EMC/DEC=20/20/20/20/20 (volume ratio). The secondary battery was manufactured as shown above. FIG. 5 shows a schematic cross-sectional view (FIG. 5(b)) and a plan view (FIG. 5(a)) illustrating an example of the secondary battery according to the present example.

(Evaluation of Secondary Battery)

20 secondary batteries were manufactured using the above-described method. A charge/discharge test was conducted on each secondary battery at a temperature of 20° C. with a 1C rate, and a capacity retention ratio after 100 cycles and a maximum variation in the thickness of the rectangular portion of laminated outer enclosure 2 were measured and an average value thereof was calculated. Regarding the set value of 1C, the discharge capacity at third charge/discharge was assumed to be 1C when charge/discharge was conducted three times before conducting the charge/discharge test. The thickness was measured using a micrometer. The evaluation result is shown in Table 1.

Example 2

A secondary battery was manufactured and evaluated using a method similar to that of Example 1 except that the height of the concave portion was 1.0 mm. The evaluation result is shown in Table 1.

Example 3

A secondary battery was manufactured and evaluated using a method similar to that of Example 1 except that the height of the concave portion was be 2.5 mm. The evaluation result is shown in Table 1.

Example 4

Figure 6:
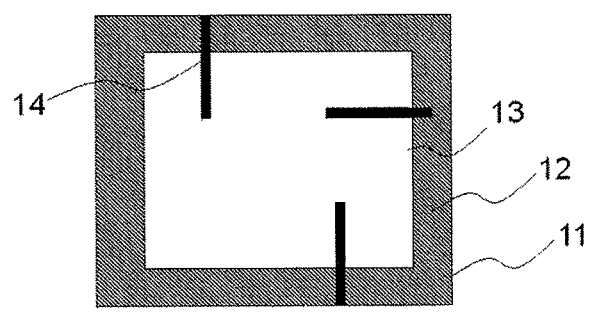
FIG. 6 is a plan view illustrating an example of a secondary battery according to Example 4.

A secondary battery was manufactured and evaluated using a method similar to that of Example 2 except that laminated outer enclosure 2 having concave portions shown in FIG. 6 were manufactured and used in the same way as in Example 2. The evaluation result is shown in Table 1.

As shown in FIG. 6, in the present example, laminated outer enclosure 2 includes three concave portions. Two of the three concave portions are arranged at positions at a distance of 9 mm from the side from which positive electrode lead terminal 4 or negative electrode lead terminal 5 protrudes respectively. The remaining one concave portion is arranged at a position at a distance of 9 mm from the side from which positive electrode lead terminal 4 or negative electrode lead terminal 5 does not protrude and at a distance of 2 mm from the side from which negative electrode lead terminal 5 protrudes.

The size of the three concave portions is; height 1.0 mm, width 1.0 mm and length 10 mm.

Example 5

Figure 7:
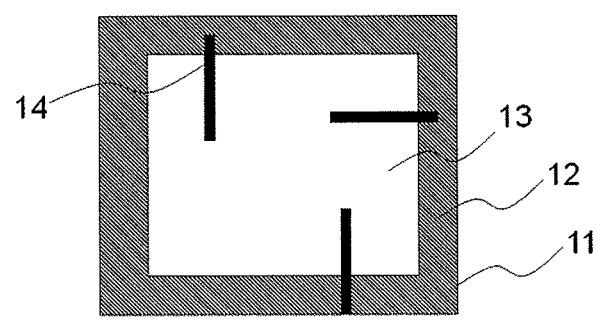
FIG. 7 is a plan view illustrating an example of a secondary battery according to Example 5.

A secondary battery was manufactured and evaluated using a method similar to that of Example 2 except that laminated outer enclosure 2 having concave portions shown in FIG. 7 were manufactured and used in the same way as in Example 2. The evaluation result is shown in Table 1.

As shown in FIG. 7, laminated outer enclosure 2 in the present example includes three concave portions. One of the three concave portions is arranged at a position at a distance of 9 mm from the side from which negative electrode lead terminal 5 protrudes. One concave portion is arranged at a position at a distance of 9 mm from the side from which positive electrode lead terminal 4 protrudes and at a distance of 1 mm from the side from which positive electrode lead terminal 4 or negative electrode lead terminal 5 does not protrude. The remaining one concave portion is arranged at a position at a distance of 9 mm from the side from which positive electrode lead terminal 4 or negative electrode lead terminal 5 does not protrude and at a position at a distance of 1 mm from the side from which negative electrode lead terminal 5 protrudes.

The size of the three concave portions is; height 1.0 mm, width 1.0 mm and length 10 mm.

Example 6

Figure 8:
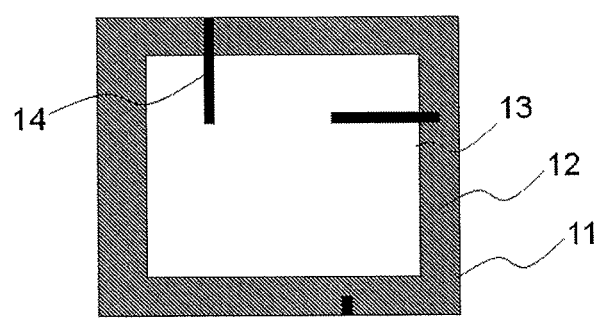
FIG. 8 is a plan view illustrating an example of a secondary battery according to Example 6.

A secondary battery was manufactured and evaluated using a method similar to that of Example 2 except that laminated outer enclosure 2 having concave portions shown in FIG. 8 were manufactured and used in the same way as in Example 2. The evaluation result is shown in Table 1.

As shown in FIG. 8, laminated outer enclosure 2 in the present example includes three concave portions. Two of the three concave portions are arranged at positions at a distance of 9 mm from the side from which positive electrode lead terminal 4 or negative electrode lead terminal 5 protrudes respectively. The one remaining concave portion is arranged at a position at a distance of 9 mm from the side from which positive electrode lead terminal 4 or negative electrode lead terminal 5 does not protrude and at a distance of 2 mm from the side from which negative electrode lead terminal 5 protrudes.

The size of the short concave portion is; height 1.0 mm, width 1.0 mm and length 2.0 mm. Furthermore, the size of the other two concave portions is; height 1.0 mm, width 1.0 mm and length 10 mm.

Example 7

Figure 9:
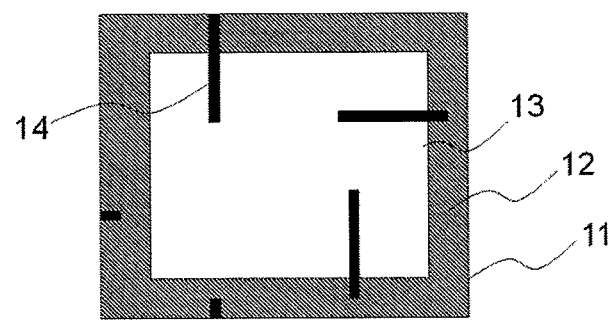
FIG. 9 is a plan view illustrating an example of a secondary battery according to Example 7.

A secondary battery was manufactured and evaluated using a method similar to that of Example 2 except that laminated outer enclosure 2 having concave portions shown in FIG. 9 were manufactured and used in the same way as in Example 2. The evaluation result is shown in Table 1. As shown in FIG. 9, laminated outer enclosure 2 in the present example includes five concave portions. Three of the five concave portions are arranged at positions at a distance of 9 mm from the side from which positive electrode lead terminal 4 or negative electrode lead terminal 5 protrudes respectively. Of these concave portions, the concave portion arranged at a position at a distance of 9 mm from the side from which negative electrode lead terminal 5 protrudes is arranged at a position at a distance of 2 mm from the side from which positive electrode lead terminal 4 or negative electrode lead terminal 5 does not protrude. The remaining two of the five concave portions are arranged at positions at a distance of 9 mm from the side from which positive electrode lead terminal 4 or negative electrode lead terminal 5 does not protrude. Of these two, the concave portion arranged on the negative electrode lead terminal 5 side is arranged at a position at a distance of 2 mm from the side from which negative electrode lead terminal 5 protrudes.

The size of the two short concave portions is; height 1.0 mm, width 1.0 mm and length 2.0 mm. On the other hand, the size of the other three concave portions is; height 1.0 mm, width 1.0 mm and length 10 mm.

Example 8

Figure 10:
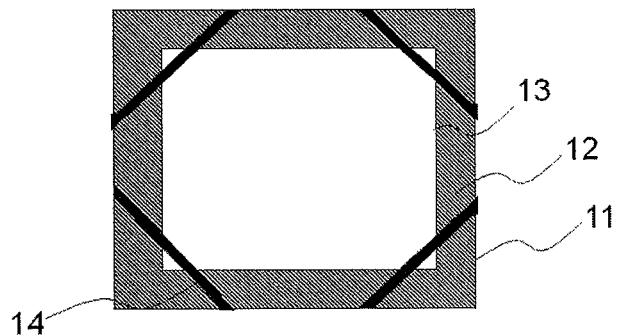
FIG. 10 is a plan view illustrating an example of a secondary battery according to Example 8.

A secondary battery was manufactured and evaluated using a method similar to that of Example 2 except that laminated outer enclosure 2 having concave portions shown in FIG. 10 were manufactured and used in the same way as in Example 2. The evaluation result is shown in Table 1.

As shown in FIG. 10, laminated outer enclosure 2 in the present example includes four concave portions. The four concave portions are arranged so as to intersect each side at positions at a distance of 10 mm along each side from the point of intersection between the side from which positive electrode lead terminal 4 or negative electrode lead terminal 5 protrudes and the side from which positive electrode lead terminal 4 or negative electrode lead terminal 5 does not protrude.

The size of the four concave portions is; height 1.0 mm and width 0.71 mm (width at the portion intersecting each side: 1.0 mm).

Example 9

Figure 11:
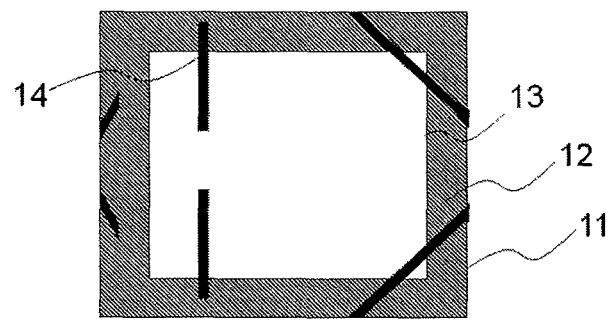
FIG. 11 is a plan view illustrating an example of a secondary battery according to Example 9.

A secondary battery was manufactured and evaluated using a method similar to that of Example 2 except that laminated outer enclosure 2 having concave portions shown in FIG. 11 were manufactured and used in the same way as in Example 2. The evaluation result is shown in Table 1.

As shown in FIG. 11, laminated outer enclosure 2 in the present example includes six concave portions. Four of the six concave portions are arranged so as to intersect each side at positions at a distance of 10 mm along each side from the point of intersection between the side from which negative electrode lead terminal 5 protrudes and the side from which positive electrode lead terminal 4 or negative electrode lead terminal 5 does not protrude. Two of the four concave portions also intersect the other side. The remaining two concave portions have a length of 2 mm from the side from which positive electrode lead terminal 4 protrudes, in the direction perpendicular to the side. The two of the six concave portions are arranged at positions at a distance of 9 mm from the side from which positive electrode lead terminal 4 protrudes and at positions at a distance of 2 mm from the side from which positive electrode lead terminal 4 or negative electrode lead terminal 5 does not protrude.

The size of the shortest concave portions is; height 1.0 mm and width 0.71 mm (width at the portion intersecting each side: 1.0 mm). The size of the two concave portions parallel to the side from which positive electrode lead terminal 4 or negative electrode lead terminal 5 protrudes is; height 1.0 mm, width 1.0 mm and length 10 mm. The size of the remaining two concave portions is; height 1.0 mm and width 0.71 mm (width at the portion intersecting each side: 1.0 mm).

Example 10

Figure 12:
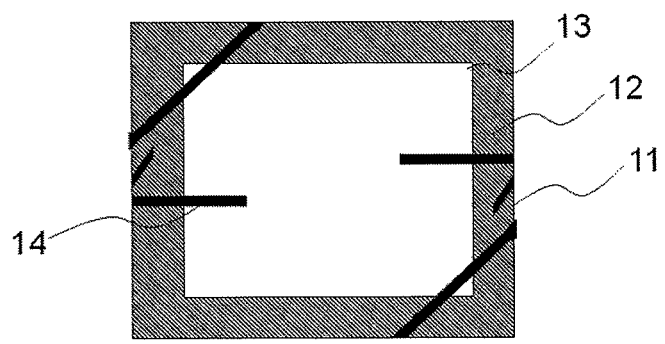
FIG. 12 is a plan view illustrating an example of a secondary battery according to Example 10.

A secondary battery was manufactured and evaluated using a method similar to that of Example 2 except that laminated outer enclosure 2 having concave portions shown in FIG. 12 were manufactured and used in the same way as in Example 2. The evaluation result is shown in Table 1.

As shown in FIG. 12, laminated outer enclosure 2 in the present example has six concave portions. Two of the six concave portions are arranged so as to intersect each side at positions at a distance of 10 mm along each side from the point of intersection between the side from which negative electrode lead terminal 5 protrudes and the side from which positive electrode lead terminal 4 or negative electrode lead terminal 5 does not protrude. Two of the six concave portions are arranged so as to intersect each side at a position at a distance of 13 mm along each side from the point of intersection respectively and have a length of 2 mm from the side from which positive electrode lead terminal 4 or negative electrode lead terminal 5 protrudes, in the direction perpendicular to the side. Two of the six concave portions are arranged at positions at a distance of 16 mm from the point of intersection.

The size of the shortest concave portions is; height 1.0 mm and width 0.71 mm (width at the portion intersecting each side: 1.0 mm). The size of the two concave portions parallel to the side from which positive electrode lead terminal 4 or negative electrode lead terminal 5 does not protrudes is: height 1.0 mm, width 1.0 mm and length 10 mm. The size of the remaining two concave portions is; height 1.0 mm and width 0.71 mm (width at the portion intersecting each side: 1.0 mm).

Example 11

Figure 13:
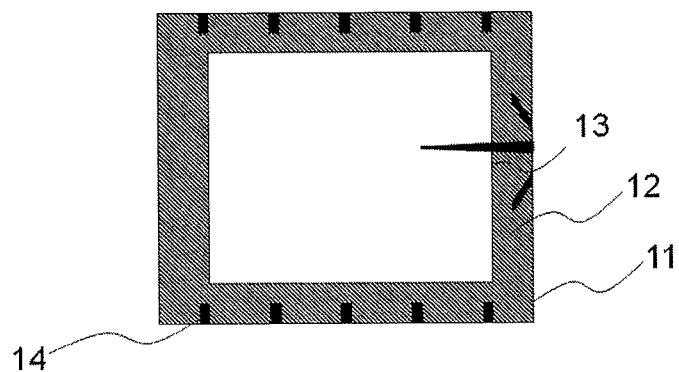
FIG. 13 is a plan view illustrating an example of a secondary battery according to Example 11.

A secondary battery was manufactured and evaluated using a method similar to that of Example 2 except that laminated outer enclosure 2 having concave portions shown in FIG. 13 were manufactured and used in the same way as in Example 2. The evaluation result is shown in Table 1.

As shown in FIG. 13, laminated outer enclosure 2 in the present example has thirteen concave portions. One of the thirteen concave portions has the shape of an isosceles triangle arranged at a position at a distance of 13 mm along the side from which negative electrode lead terminal 5 protrudes from a point of intersection with the side from which positive electrode lead terminal 4 or negative electrode lead terminal 5 does not protrude and the side from which negative electrode lead terminal 5 protrudes and having a length of 10 mm in a direction perpendicular to the side from which negative electrode lead terminal 5 protrudes. Two of the thirteen concave portions are arranged so as to intersect with the side at positions at a distance of 13 mm along the side from which negative electrode lead terminal 5 protrudes from the point of intersection and have a length of 2 mm from the side from which negative electrode lead terminal 5 protrudes, in a direc-

Comparative Example 2

Figure 14:
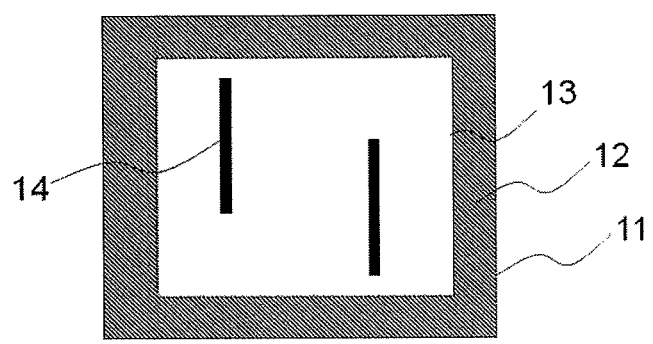
FIG. 14 is a plan view illustrating an example of a secondary battery according to Comparative example 2.

A secondary battery was manufactured and evaluated using a method similar to that of Example 2 except that laminated outer enclosure 2 having concave portions shown in FIG. 14 was manufactured in the same way as in Example 2. The evaluation result is shown in Table 1.

As shown in FIG. 14, laminated outer enclosure 2 has two concave portions in the present example. The two concave portions are arranged at positions at a distance of 9 mm from the side from which positive electrode lead terminal 4 or negative electrode lead terminal 5 protrudes and at a distance of 2 mm from the side from which positive electrode lead terminal 4 or negative electrode lead terminal 5 does not protrude respectively.

The size of the two concave portions is; height 1.0 mm, width 1.0 mm and length 10 mm.

TABLE 1

| | Concave portion | Concave portion inside outer circumferential region | Area of concave portion inside outer circumferential region/area of concave portion inside border (%) | Ratio of concave portion contacting border (%) | Ratio of concave portion contacting border and inner edge of outer circumferential region (%) | Area of concave portion inside outer circumferential region/area of outer circumferential region (%) | Height of concave portion/thickness of laminated electrode body (%) | Capacity retention ratio (%) | Increment of thickness (mm) |
|---|---|---|---|---|---|---|---|---|---|
| Example 1 | Yes | Yes | 33 | 100 | 100 | 2.2 | 5 | 95 | 0.2 |
| Example 2 | Yes | Yes | 33 | 100 | 100 | 2.2 | 17 | 96 | 0.1 |
| Example 3 | Yes | Yes | 33 | 100 | 100 | 2.2 | 42 | 88 | 0.3 |
| Example 4 | Yes | Yes | 33 | 67 | 67 | 2.7 | 17 | 93 | 0.2 |
| Example 5 | Yes | Yes | 33 | 33 | 33 | 2.7 | 17 | 88 | 0.3 |
| Example 6 | Yes | Yes | 36 | 67 | 33 | 2.2 | 17 | 90 | 0.3 |
| Example 7 | Yes | Yes | 35 | 60 | 20 | 3.3 | 17 | 91 | 0.2 |
| Example 8 | Yes | Yes | 75 | 100 | 100 | 8.7 | 17 | 98 | 0.1 |
| Example 9 | Yes | Yes | 53 | 67 | 33 | 6.5 | 17 | 97 | 0.1 |
| Example 10 | Yes | Yes | 62 | 100 | 67 | 7.6 | 17 | 95 | 0.1 |
| Example 11 | Yes | Yes | 80 | 100 | 8 | 5.9 | 17 | 91 | 0.2 |
| Comparative example 1 | No | No | — | — | — | 0 | — | 85 | 0.5 |
| Comparative example 2 | Yes | No | 0 | 0 | 0 | 0 | 17 | 85 | 0.4 | tion perpendicular to the side. Ten of the thirteen concave portions are arranged at intervals of 4 mm from a position of 4 mm along the side from which positive electrode lead terminal 4 or negative electrode lead terminal 5 does not protrude from the point of intersection.

The size of the ten concave portions contacting the side from which positive electrode lead terminal 4 or negative electrode lead terminal 5 does not protrude is; height 1.0 mm, width 1.0 mm and length 2.0 mm. The size of the two concave portions contacting the side from which negative electrode lead terminal 5 protrudes is; height 1.0 mm and width 0.71 mm (width at the portion intersecting each side: 1.0 mm). The size of the concave portion having the shape of an isosceles triangle is; height 1.0 mm and base 3.0 mm.

Comparative Example 1

A secondary battery was manufactured and evaluated using a method similar to that of Example 1 except that no concave portion was formed in the rectangular portion of laminated outer enclosure 2. The evaluation result is shown in Table 1.

As is clear from the results shown in Table 1, when the outer enclosure surface facing the electrode surface of laminated electrode body 1 is provided with concave portions 14 and at least one concave portion 14 is located inside outer circumferential region 12, even when a gas is generated in a cycle, the gas can be released from the electrode surface to the vicinity of the laminated bonded portion via concave portion 14, and it is thereby possible to promote charging/discharging reaction and improve the capacity retention ratio. On the other hand, in comparative example 1 where no concave portion 14 is located on the outer enclosure surface or in comparative example 2 where no concave portion 14 is located in outer circumferential region 12, it has been proven that the gas is likely to accumulate in the vicinity of laminated electrode body 1 and an increase in the thickness which is considered attributable to swelling or contraction of the electrode and accumulating a gas obstructs the charging/discharging reaction, resulting in a reduced capacity retention ratio.

Example 12

Ten secondary batteries manufactured in Example 1 were evaluated in the same way as in Example 1 except that they were evaluated by fixing the rectangular portions of laminated outer enclosure 2 in close contact with each other. As a result, the capacity retention ratio after 50 cycles was 94%.

Comparative Example 3

Ten secondary batteries manufactured in Comparative example 1 were evaluated in the same way as in Comparative example 1 except that they were evaluated by fixing the rectangular portions of laminated outer enclosure 2 in close contact with each other. As a result, the capacity retention ratio after 50 cycles was 79%.

The present application claims a priority based on Japanese Patent Application No. 2011-067916, filed on Mar. 25, 2011, the disclosure of which is incorporated herein by reference in its entirety.

The present invention has been described so far with reference to the exemplary embodiment and examples, but the present invention is not limited to the above-described exemplary embodiment and examples. Various changes which are understandable to those skilled in the art may be made to the configuration and details of the present invention without departing from the scope of the present invention.

What is claimed is:

1. A secondary battery comprising:
a laminated electrode body provided with at least one pair of positive and negative electrodes, a non-aqueous electrolyte which is lithium salt as an electrolyte dissolved in a non-aqueous solvent, and an outer enclosure that accommodates the laminated electrode body and the non-aqueous electrolyte,
wherein said outer enclosure comprises one or more concave portions, inside a border corresponding to an outer edge of an electrode surface of an outermost layer of said laminated electrode body, on a surface facing said electrode surface,
wherein at least one of said concave portions is located inside a band-shaped outer circumferential region having an area that is a half of a total area encompassed by said border, said band-shaped outer circumferential region set inside said border, and
wherein the ratio of the height of said concave portion to the thickness of said laminated electrode body is 1 to 17%, and
wherein the outer enclosure is entirely sealed.

2. The secondary battery according to claim 1, wherein said outer circumferential region keeps an evenly spaced width in an inward direction of said border.

3. The secondary battery according to claim 1, wherein the ratio of the area occupied by said concave portion inside said outer circumferential region to the area occupied by said concave portion inside said border is 30% or more.

4. The secondary battery according to claim 1, wherein the ratio of a number of said concave portions that contacts said border to a total number of said concave portions is 30% or more.

5. The secondary battery according to claim 1, wherein the ratio of a number of said concave portions that contacts said border and an inner edge of said outer circumferential region to a total number of said concave portions is 30% or more.

6. The secondary battery according to claim 1, wherein the ratio of the area occupied by said concave portion in said outer circumferential region to the area of said outer circumferential region is 1 to 80%.

7. The secondary battery according to claim 1, wherein said outer enclosure is a laminated outer enclosure.

8. The secondary battery according to claim 7, wherein said laminated electrode body comprises a convex portion on an electrode surface of an outermost layer, and
said concave portion is formed in correspondence with the convex portion.

9. A method of manufacturing a secondary battery including a laminated electrode body provided with at least one pair of positive and negative electrodes, a non-aqueous electrolyte which is lithium salt as an electrolyte dissolved in a nonaqueous solvent, and an outer enclosure that accommodates said laminated electrode body, the method comprising:
preparing an outer enclosure provided with one or more concave portions, inside a border corresponding to an outer edge of an electrode surface of an outermost layer of said laminated electrode body, on a surface facing said electrode surface,
wherein:
at least one of said concave portions is located inside a band-shaped outer circumferential region having an area that is a half of a total area encompassed by said border, said band-shaped outer circumferential region set inside said border;
the ratio of the height of said concave portion to the thickness of said laminated electrode body is 1 to 17%; and
the outer enclosure is entirely sealed;
accommodating said laminated electrode body and said non-aqueous electrolyte in said outer enclosure.

10. The method of manufacturing a secondary battery according to claim 9, wherein said outer circumferential region keeps an evenly spaced width in an inward direction of said border.

11. The method of manufacturing a secondary battery according to claim 9, wherein the ratio of the area occupied by said concave portion inside said outer circumferential region to the area occupied by said concave portion inside said border is 30% or more.

12. The method of manufacturing a secondary battery according to claim 9, wherein the ratio of said concave portion that contacts said border is 30% or more.

13. The method of manufacturing a secondary battery according to claim 9, wherein the ratio of said concave portion that contacts said border and an inner edge of said outer circumferential region is 30% or more.

14. The method of manufacturing a secondary battery according to claim 9, wherein the ratio of the area occupied by said concave portion inside said outer circumferential region to the area of said outer circumferential region is 1 to 80%.

15. The method of manufacturing a secondary battery according to claim 9, wherein said outer enclosure is a laminated outer enclosure.

16. The method of manufacturing a secondary battery according to claim 15, wherein preparing said outer enclosure comprises forming said concave portion in said outer circumferential region through squeezing.

17. The method of manufacturing a secondary battery according to claim 15, wherein said laminated electrode body comprises a convex portion on the electrode surface of the outermost layer, preparing said outer enclosure comprises forming said concave portion in correspondence with said convex portion.

18. The method of manufacturing a secondary battery according to claim 17, wherein said convex portion is formed by pressing the electrode surface of the outermost layer of said laminated electrode body using a roller or metal die.

19. The method of manufacturing a secondary battery according to claim 17, wherein said convex portion is formed through nonuniform swelling or contraction of the electrode during charge/discharge.

20. The secondary battery according to claim 1, wherein an area enough to store a gas generated is provided in the vicinity of the bonded portion of the outer enclosure.

* * * * *